Patented June 16, 1936

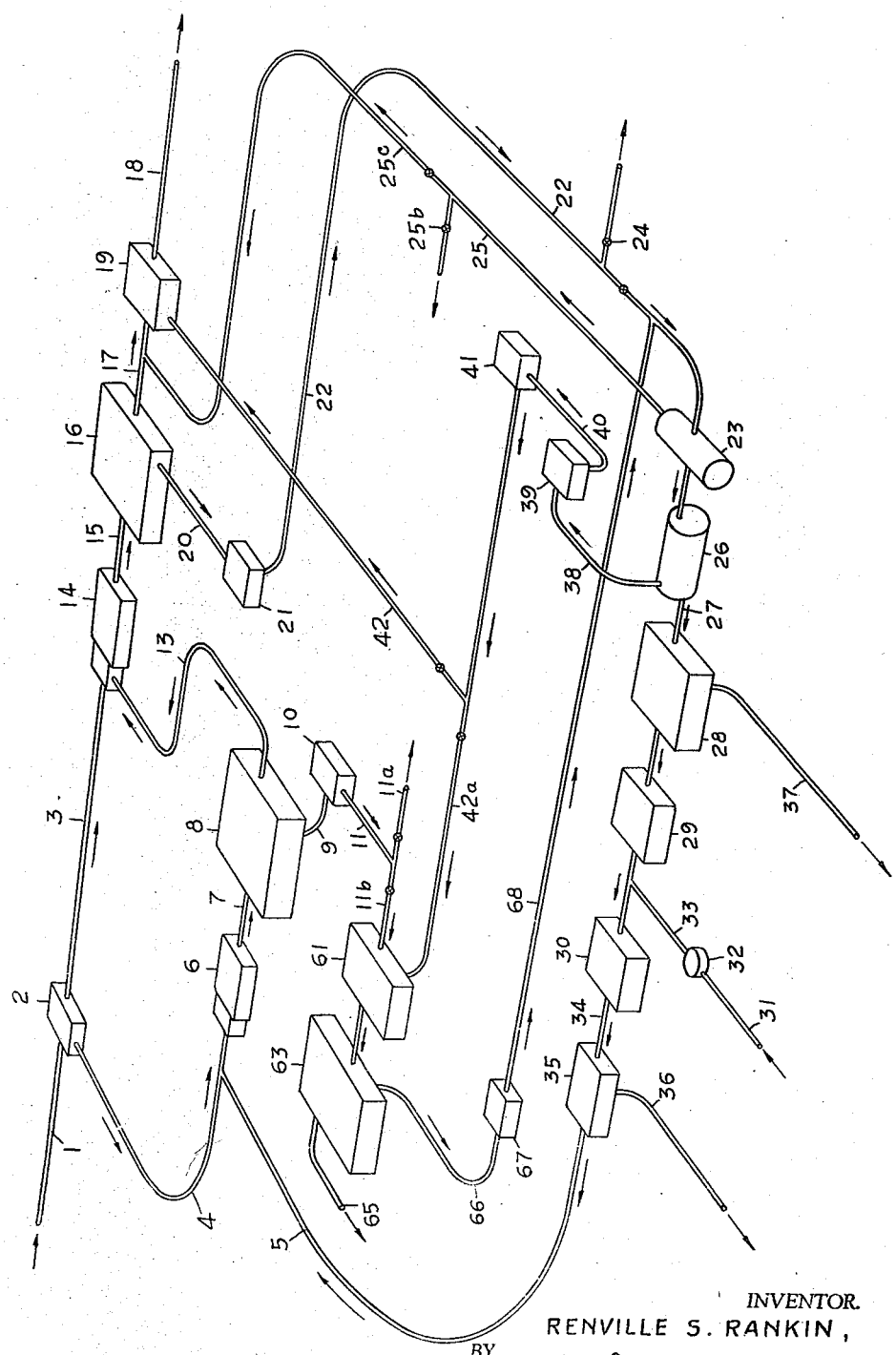

2,044,584

UNITED STATES PATENT OFFICE 2,044,584

WATER SOFTENING

Renville S. Rankin, Chicago, Ill., assignor to The Dorr Company, Inc., New York, N. Y., a corporation of Delaware Original application March 27, 1934, Serial No. 717,568. Divided and this application January 10, 1936, Serial No. 58,462

2 Claims. (Cl. 210—16)

The invention relates to the treatment of impure water particularly to remove, overcome or decrease certain hardness characteristics thereof. In the performing of the invention there will also be realized a substantial elimination of any turbidity existing because of suspended solids therein.

It is well known that the hardness characteristics of certain water is due to the presence therein of calcium or more particularly certain compounds thereof, typified for example by calcium in the form of calcium bicarbonate—$Ca(HCO_3)_2$—and magnesium or more particularly certain compounds thereof typified for example by magnesium in the form of magnesium bicarbonate—$Mg(HCO_3)_2$.

The present invention particularly relates to a method for the treating of water having substantial calcium and magnesium hardness characterstics.

One object of the invention is to provide a lime, calcium oxide—$CaO$—, water-softening treatment or process of such a character, and to carry out the process in such a manner, that after the process has once been started a supply of lime can be derived therefrom sufficient to at least provide a substantial portion of the lime required for the ultimate carrying out of the water treatment process, generally an amount sufficient to provide all the lime required for the process, and in certain instances an amount sufficient to provide not only the lime required for the process, but also an excess which is available for other use or commercial distribution.

According to the present invention water is treated with lime for the converting of dissolved or soluble calcium constituents and dissolved or soluble magnesium constituents into precipitable solid form or compounds preparatory to a settling of the same as sludge and the ultimate removal as or in settled sludge of the precipitated compounds thus produced and one aspect of the present invention revolves about the carbonation of a quantity of the sludge thus produced and obtained so as to reconvert the precipitated magnesium compounds into a liquid form, as in the form of a magnesium bicarbonate—$Mg(HCO_3)_2$, whereby after a subsequent settling or sedimentation the effluent of said subsequent sedimentation can be withdrawn with the magnesium content in liquid form, thus leaving a sludge containing a calcium constituent constituting the main solid ingredient thereof. By such process as that just referred to one realizes a supply of calcium, as in the form of calcium carbonate—$CaCO_3$—, which upon ultimate roasting or calcining provides a continuous supply of lime for the process and in certain instances of a supply in excess of that requisite for the process whereby there is available lime for other uses. Also by such process and according to another aspect of the present invention one is enabled to dispose of much of the undesirable magnesium constituent (eliminated by the water treating process) in a liquid form whereby it is readily disposed of and in a manner that is not objectionable, thereby avoiding any objectionable discharge from the process or system of solid magnesium constituents in the form of sludge.

One object of the invention is to provide a method according to which a substantial portion of the magnesium content which is eliminated or removed by or during the water treating process is disposed of in liquid form.

Another object of the invention is to remove certain constituents of the water that impart hardness characteristics to the water, namely to remove certain calcium constituents and certain magnesium constituent by converting the same into solid form by the use of lime preparatory to sedimentation and by removing of the resulting solids in the form of a sludge and by the thereafter treating at least some of the sludge by carbonation to change certain of the solids of the sludge—to wit, the magnesium content in particular—into liquid whereby after sedimentation or filtering or both the remaining solids which consist primarily or largely of a calcium constituent can be ultimately employed to provide, when calcined, a source of lime for the process.

The present invention is one which adapts itself to the carbonating of sludge derived from a lime treatment of a portion only of the water to be treated for the converting of solid magnesium compounds of the sludge into liquid form preparatory to disposal to waste of the magnesium constituent.

Other objects, aspects, and features of the invention will become apparent from that which follows:

As illustrative of a system in which the invention may be performed reference is made to the accompanying drawing forming a part of this specification.

The sole figure of said drawing diagrammatically illustrates a system in which the water to be treated is divided into a main flow and a diverted flow, in which to the diverted flow there is supplied lime—usually the lime produced in and by the process carried out within the system—requisite for the process, in which the lime or dosed diverted flow is subjected to primary sedimentation under conditions to permit the withdrawal of the solids as settled sludge and under conditions that allow the effluent to pass to and be mixed with the main flow, thus lime dosing the latter, in which the lime dosed main flow is subjected to a main sedimentation carried out in such a manner as to permit the effluent thereof to ultimately pass to sand filters or ultimately to the pipes of the water distributing system to which the treated water is supplied, and under conditions to permit the sludge of the main sedimentation to be treated so that solid constituents thereof are ultimately calcined to thus produce lime employed in the process. The important feature of the system illustrated revolves about the employment of apparatus for carbonating the sludge delivered from the primary sedimentation and for the subsequent subjecting of said carbonated sludge to a settling or sedimentation operation under conditions whereby the effluent containing magnesium compounds in solution can pass to waste while the sludge containing certain solid calcium constituents can be pumped to a position for ultimately calcining and thereby producing of lime.

Reference will now be made to the drawing in detail. Like functioning parts are referred to by like reference characters through the specification and on the drawing.

It has heretofore been pointed out that the present invention is directed to the treating of water having a calcium hardness characteristic because of the calcium component thereof provided, for example, by calcium bicarbonate—$Ca(HCO_3)_2$—and also having a magnesium hardness characteristic because of the magnesium component thereof provided, for example, by magnesium bicarbonate—$Mg(HCO_3)_2$.

The system of the sole figure is essentially the same as that of the system shown in the Lykken and Estabrook application entitled: "Water clarification", bearing Serial No. 717,567 filed March 27, 1934. This case is a division of my application Serial No. 717,568 which was filed on March 27, 1934, to wit, on date even with that on which said Lykken and Estabrook application was filed. The invention of the system of the sole figure hereof over and above that of the Lykken and Estabrook application primarily resides in the employment of the carbonation apparatus 61 and the settling tank or sedimentation chamber 63 and which are provided for treating the sludge from the preliminary or prime sedimentation means 8 so that in said sludge the magnesium content will be in a soluble form whereby they can be passed to waste as a liquid instead of in solid form the latter of which may be objectionable in certain instances. According to the system of the sole figure hereof the water which is supplied along the path 1 is divided at the dividing box 2 into a main or undiverted flow which passes along the path 3 and into the diverted flow which passes along the path 4. Lime for the process—preferably lime derived as a result of performing the process—is supplied along the path 5 and is mixed with the diverted water flow, as at 6. The lime supplied to the diverted flow is considerably in excess of that required for the diverted flow and as previously indicated is sufficient to meet the requirements for the entire process. The limed or dosed diverted flow passes from the mixing device 6 along the path 7 into a preliminary settling tank or primary sedimentation chamber 8 as it may be called wherein a preliminary sedimentation is carried out. The resulting settled sludge which contains magnesium hydroxide —$Mg(OH)_2$—, possibly some magnesium oxide —MgO—, and calcium carbonate—$CaCO_3$—is withdrawn along the path 9 by means of the sludge pump 10 and is passed therefrom through a pipe 11 having a valve controlled branch 11a leading directly to waste and a valve controlled branch 11b leading to a carbonation apparatus 61.

The effluent from the preliminary sedimentation and which effluent contains sufficient lime in the form of hydrated lime to satisfy the requisites of the process passes along the path 13 to a mixing device 14 wherein it is mixed with the main or undiverted flow supplied to the mixing device along the path 3 and whereby the main flow is thus effectively limed or dosed. The apparatus at 14 may serve not only as a mixing means but it may also serve as means for aiding flocculation or in other words as a flocculator preparatory to the delivery of the mixed flows along the path 15 into the main settling tank or secondary sedimentation chamber 16. The effluent from the main sedimentation carried out in 16 passes along the paths 17 and 18 to sand filters or water distributing pipes, however prior to delivery therefrom it is preferable to subject the effluent to carbonation as at 19.

The sludge in the main sedimentation chamber passes along the path 20, to and from the sludge pump 21 to and along the valve controlled pipe or path 22 to a vacuum filter 23. This pipe 22 however may have a valve controlled branch 24 leading therefrom by which if desired the sludge, or a portion of the sludge, can be otherwise disposed of. From the vacuum filter the effluent can pass along the path 25 to waste through the valve controlled branch 25b or back into the system, as into the pipe 17, through the valve controlled branch 25c. From the filter 23 the filter cake, or solid portion of the sludge subjected to the filtering operation, passes to the kiln 26 wherein the calcining operation is carried out for the converting of the solid calcium compounds thereof into calcium oxide—CaO—or quicklime. The products of combustion required for the calcining operation, or at least some of the combustion products, pass from the kiln along the path 38 into the scrubber 39 thence along the path 40, and by means of the compressor 41 are forced along a path that comprises the valve controlled branch 42 to and into the carbonation apparatus 19 whereby carbon dioxide—$CO_2$—required for the carbonation process carried out therein is supplied to said carbonation apparatus, while according to requirements combustion products are by means of the compressor 41 forced along a path that comprises valve controlled branch 42a pass to carbonation apparatus 61.

Mention has hereto been made of the fact that the sludge from the primary sedimentation can be passed along the valve controlled pipe 11b into the carbonation apparatus 61. In this apparatus 61 much of the magnesium compounds are, because of the carbonation operation carried out therein, changed into compounds that are quite soluble and/or which do not settle out, in, or with, the sludge when the thus carbonated sludge is subjected to sedimentation. From the carbonation apparatus 61 the carbonated sludge passes into the sedimentation chamber or settling tank 63 from which the effluent which contains magnesium compounds in solution can pass along the path 65 directly to waste in liquid form thereby avoiding the accumulation of magnesium compounds in solid form. This effluent will also contain a certain amount of calcium compounds in liquid form but it is important to note that there is therefore avoided any accumulation of the calcium compounds in solid form. The sludge which settles at or in the bottom of the settling tank 63 passes along the path 66 and is pumped by the sludge pump 67 along the path 68 to and into the line 22 leading to the vacuum filter. The sludge thus passed to the vacuum filter from the settling tank 63 contains a certain amount of calcium compounds which when later roasted become a part of the lime supply. From the calcining kiln the calcium oxide—CaO—is stored at 28.

Lime is fed from storage by means of lime feeder 29 to the slaker 30 and to which water is also supplied as through the pipe 31, meter 32 and pipe 33. From the slaker the lime hydrate passes along the path 34 preferably to a classifier 35 whereby grit and unburned material can be passed along the path 36 in one direction while the lime hydrate, freed from grit, may pass along the path 5 for mixing at 6 with diverted flow.

From what has preceded it will be clear that the particular novelty of the system of this figure over and above the system of said Lykken and Estabrook application resides in providing for the carbonation of the sludge from the preliminary or prime sedimentation means 8 and the subsequent subjecting of the carbonated sludge to a settling or sedimentation operation whereby the magnesium compounds in particular can be passed to waste in liquid form and whereby a certain amount of the calcium compounds can be retained within, or passed back into, the system for the production of lime employed in the system.

Any excess of lime can be removed from the lime storage along the path 37 and disposed of as for commercial uses.

If the particular operation carried out indicates a deficiency in lime product, then the make-up lime requisite for the process can be supplied as at the storage location 28.

As in the instance of the invention of the Lykken and Estabrook patent referred to (the application of which was filed on even date with the filing of the application for the patent of which this is a divisional application), the invention is applicable to the treatment of impure waters, to wit, waters having impurities therein regardless as to whether the impurities in the water are of a character which impose upon the water certain hardness or other objectionable characteristics, or whether the impurities in the water exist because of certain solids—organic or inorganic—in suspension therein, and thereby imparting turbidity to the water or imposing other objectionable characteristics upon the water as, for example, by solids incident to city sewage or to trade or industrial wastes and of which water exists as a major part thereof.

I claim:

1. In the treating of impure water the method which comprises dividing the water to be treated into a main flow and a diverted flow, mixing with the diverted flow lime sufficient in quantity for the treating method, subjecting the limed diverted flow to preliminary quiescent sedimentation, passing the effluent from the preliminary sedimentation to the main flow and mixing therewith, subjecting the mixed flow to a main quiescent sedimentation, withdrawing sludge from the preliminary sedimentation, carbonating the sludge withdrawn from the preliminary sedimentation, subjecting said carbonated sludge to a third quiescent sedimentation, disposing of the effluent from said third sedimentation along the path leading to waste, passing the sludge of the main sedimentation along a path in which it is ultimately calcined, passing the sludge of said third sedimentation along a path in which it is ultimately calcined, and ultimately employing lime produced in the process by the calcining of the sludges of the main and third sedimentation for supplying lime for the treating of the water.

2. In the treating of impure water the process which comprises dividing the water to be treated into a main flow and a diverted flow, mixing with the diverted flow lime sufficient in quantity for the process, subjecting the limed diverted flow to preliminary sedimentation, passing the effluent from the preliminary sedimentation to the main flow and mixing therewith, subjecting the mixed flow to a main sedimentation, withdrawing sludge from the preliminary sedimentation, withdrawing sludge from the main sedimentation, carbonating sludge withdrawn from the preliminary sedimentation, subjecting said carbonated sludge to a third sedimentation, disposing of the effluent from said third sedimentation along one path leading to waste, passing the sludge of said third sedimentation along a path in which it is ultimately calcined, and ultimately employing lime produced in the process for supplying lime for process.

RENVILLE S. RANKIN.